United States Patent [19]

Laferriére et al.

[11] Patent Number: 5,298,169
[45] Date of Patent: Mar. 29, 1994

[54] TREATMENT OF WASTE SULFURIC ACID BY GYPSUM PRECIPITATION IN A TITANIUM DIOXIDE PROCESS

[75] Inventors: Roger Laferriére, Varennes; Pierre Beaupré, both of Varennes, Canada

[73] Assignee: Kronos, Inc., Hightstown, N.J.

[21] Appl. No.: 933,227

[22] Filed: Aug. 21, 1992

[51] Int. Cl.$^5$ ............................................. C02F 1/58
[52] U.S. Cl. ..................... 210/713; 210/721; 210/747; 210/768; 423/82; 423/85; 423/166; 423/555
[58] Field of Search ............... 423/555, 166, 82, 85, 423/DIG. 2; 210/713, 726, 721, 747, 751, 783, 768

[56] References Cited

U.S. PATENT DOCUMENTS

| | | | |
|---|---|---|---|
| 3,375,066 | 3/1968 | Murakami et al. | 423/166 |
| 3,760,058 | 9/1973 | Langmesser et al. | 423/558 |
| 4,208,393 | 6/1980 | LeBel | 423/555 |

FOREIGN PATENT DOCUMENTS 1053876  5/1979  Canada .

OTHER PUBLICATIONS

Palmer, E. R., and Judd, B., "The Production of High--Titania Products from Ilmenite by a Sulphuric Acid Process", New Zealand Engineering, vol. 28, No. 8, Aug. 15, 1973, pp. 227-233.

Primary Examiner—Neil M. McCarthy
Attorney, Agent, or Firm—Michael J. Cronin

[57] ABSTRACT

Disclosed is a process for treating waste sulfuric acid generated from a process for producing titanium dioxide pigment by treating titanium slag with sulfuric acid. The waste acid is treated in a first step with a calcium-containing material to produce a gypsum suspension which is filtered and from which a filtrate is recovered. The filtrate is treated in a second step with a calcium-containing substance and clarification solids from the treatment of the titanium slag with sulfuric acid. A precipitate is produced in this second step which is subsequently filtered. The precipitate is suitable for disposal in a landfill.

7 Claims, 2 Drawing Sheets

TREATMENT OF WASTE SULFURIC ACID BY GYPSUM PRECIPITATION IN A TITANIUM DIOXIDE PROCESS

This invention relates to the treatment of waste sulfuric acid, and more particularly to the treatment of such acid as produced by the known "sulfate process", which produces titanium pigment, (TiO$_2$) from titanium slag.

BACKGROUND

The "sulfate process" has long been used to extract titanium dioxide from titanium slag. Titanium dioxide is an extremely important chemical product used in a wide variety of ways in various industries. A titanium slag usable in this process typically consists mostly of titanium dioxide, the rest being impurities, primarily the oxides of iron, magnesium, aluminum, silicon, calcium and manganese. The term titanium slag is known in the art to include titanium in slag form, titanium ore and blends of slag and titanium ore.

Briefly, the sulfate process of importance to understand this invention is as follows. Titanium slag is reacted with concentrated sulfuric acid to form titanyl sulfate as well as other sulfates. Next, in a clarification step, the product of the preceding step is separated from the muddy residues that it contains leaving a solution containing titanium sulfate.

The muddy residues obtained at the clarification step are generally filtered, washed, and then transported to a burial site.

The commercial exploitation of the sulfate process produces enormous quantities of waste sulfuric acid. Most industrial installations discharge this acid into oceans and rivers.

PRIOR DEVELOPMENTS

In Canadian Patent 1,053,876 issued May 8, 1979, there is described the basic process for the treatment of sulfuric acid waste from a titanium dioxide sulfate process broadly describing and claiming a method for handling such waste wherein gypsum is precipitated by treating the waste acid with an aqueous slurry of a calcium source material. The process produces commercial gypsum which can be sold profitability for building material and other purposes while substantially eliminating the need to dispose of the large quantities of sulfuric acid waste involved. The process as described, however, generates slime impurities which are very difficult to landfill.

In U.S. Pat. No. 4,208,393, issued Jun. 17, 1980, there is described a later process for the treatment of waste sulfuric acid from a titanium dioxide sulfate process according to which the calcium source added to precipitate gypsum is limestone. This patent is directed to a process according to which, in a first zone, pulverized calcium carbonate is added to a solution of sulfuric acid of which the free acid concentration is relatively high (140 to 220 g/l), thus precipitating gypsum in the form of a slurry. This slurry (containing 100% of the precipitated gypsum) passes to a second zone where there is added sulfuric acid having a free acid concentration which is relatively low (3 to 80 g/l). Gypsum is recovered from the mixture at the second stage. No consideration of landfill difficulties is given.

DISADVANTAGES OF CURRENT SYSTEMS

Neither of the above patents address the primary disadvantage of this process, namely the necessity of disposal of clarification mud or slime. Governments, particularly in the developed nations, have recently established laws and regulations of increasing strictness regarding discharge of such waste.

OBJECT OF THE INVENTION

It is thus an object of this invention to provide an improved process, not only for producing high quality gypsum from waste sulfuric acid, but at the same time to use at least a part of the clarification mud derived from the sulfate process already described, to create an easily disposable landfill residue.

BRIEF DESCRIPTION OF THE INVENTION

In a first step according to the process of the invention, waste sulfuric acid is partly neutralized using a material which contains calcium at an elevated temperature. This reaction precipitates gypsum and also some metallic hydroxides. The gypsum is then cleaned and separated from the metallic hydroxides in a step which yields a filtrate containing only the impurities and the sulfuric acid. This filtrate is directed to a second stage of neutralization, whereas the gypsum is discharged to the exterior for commercial use. In this second stage, the filtrate is again treated with a substance which contains calcium. This produces a precipitate which contains the majority of the impurities. No commercial gypsum is produced in second stage. We have found that, if one adds at the second stage a quantity of the clarification muds coming from the sulfate process, the precipitate becomes (after filtration and possibly oxidation) suitable to be buried in a sanitary waste burial site, whereas the filtrate itself, then consisting essentially of pure water, may be discharged directly into the oceans or rivers without damage. Without the addition of the clarification muds, the precipitate from the second stage has physical properties (permeability, compressibility, texture, etc.) which do not allow it to be buried.

More particularly, this invention provides, for use in conjunction with a process for making titanium dioxide, said process including the addition of sulfuric acid to titanium slag, the output of which separates, in a subsequent clarification step, into clarification solids and eventually leaves waste sulfuric acid:

a process for treating said waste sulfuric acid, comprising:

a) mixing the said waste sulfuric acid with a calcium-containing material to make a first mixture, thus producing a gypsum suspension, b) removing the gypsum suspension and treating it so as to abstract therefrom a liquid portion in the form of a filtrate, c) mixing said filtrate with a calcium-containing substance to make a second mixture, thereby producing a precipitate which is subsequently filtered, characterized in that, step c) further includes mixing a predetermined quantity of said clarification solids with said filtrate and said substance, in order thus to improve the consistency of said precipitate.

BRIEF DESCRIPTION OF THE DRAWINGS

The invention is described below, with the help of the attached drawings, in which.

DETAILED DESCRIPTION OF THE DRAWINGS

Figure 1:
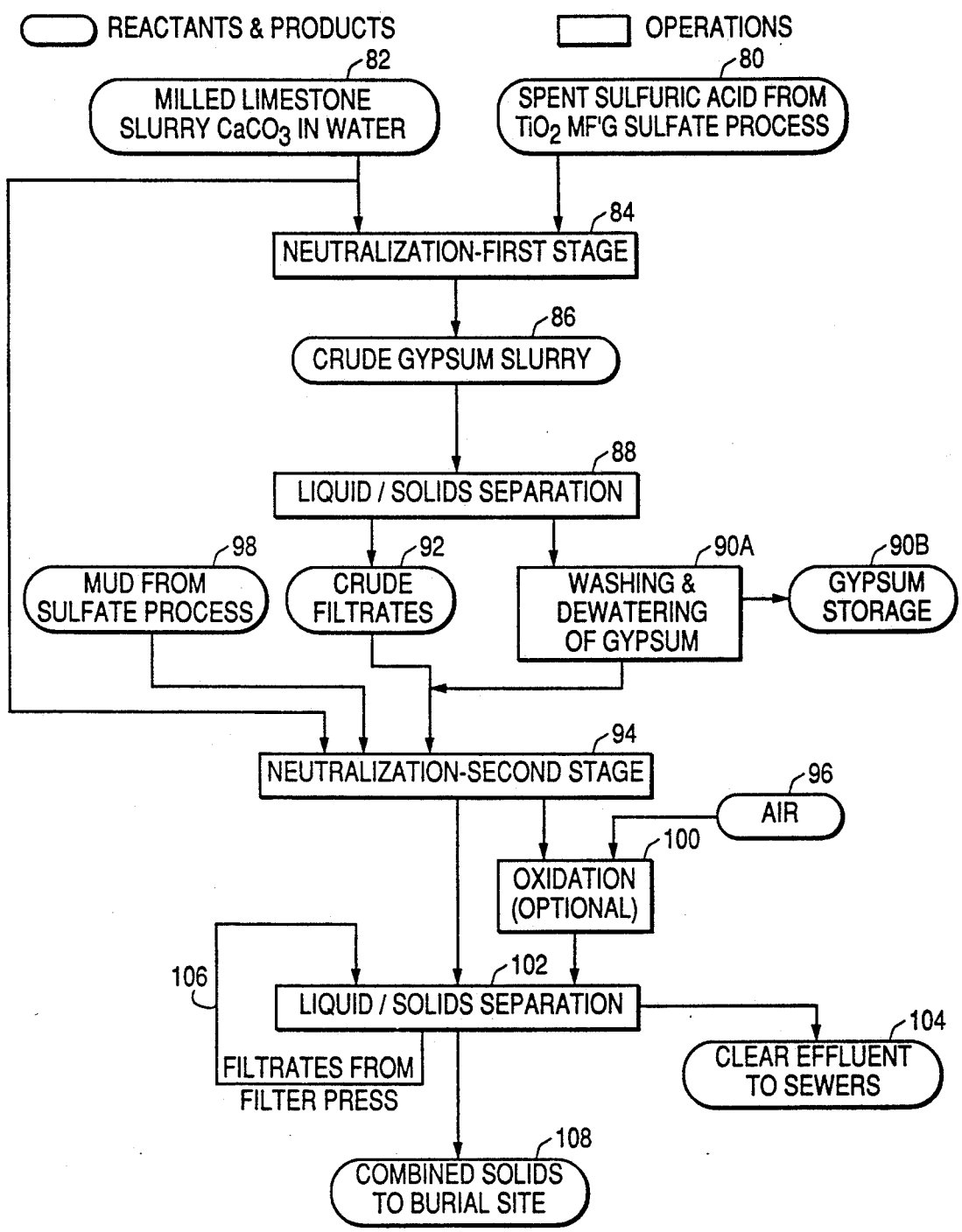
FIG. 1 is a schematic diagram showing the basic steps of the new process of treating waste sulfuric acid.

Attention is directed to FIG. 1, which shows the essential components of the process for neutralizing sulfuric acid, as covered by this invention.

Box 80 represents waste sulfuric acid, typically containing 17% free acid, produced by the titanium dioxide sulfate process. The box 82 represents the limestone slurry, i.e. $CaCO_3$ suspended in water.

The materials represented by the boxes 80 and 82 pass to a first stage of neutralization, where they are mixed together to form a first mixture, in order to produce a gypsum slurry, represented by box 86.

Next, slurry of box 86 is treated at 88 to remove impurities and to separate gypsum from the liquid portion, the latter being a filtrate. The gypsum is represented by the box 90B.

The crude filtrate (box 92) coming from box 88 combined with that of the final washing-deliquoring of gypsum passes to a second stage of neutralization represented by box 94. This second stage of neutralization takes place in a vessel to which is added a quantity of a material containing calcium. In the process of FIG. 1, the source of calcium is the slurry of limestone represented by the box 82.

In accordance with the invention, at a second stage of neutralization 94, there is added a quantity of solids of clarification (mud) from the sulfate process. In FIG. 1, these clarification solids are represented by the box 98.

The mixture which results from the second stage of neutralization (94) now can be oxidized with air (box 96). this being represented in FIG. 1 by the box 100, but it must be emphasized that oxidation is an option that can be omitted. After the oxidation 100 (if used) the mixture goes to a step where the liquid and solid components are separated. The liquid consists essentially of water (box 104 in a condition that is sufficiently clear to be discharged into a sewage system. This step is represented in FIG. 1 by the box 104. The filtrate from the muds filtration step may be be recycled,. as indicated by the arrow 106. The resulting solids, in the form of a filter cake, are suitable for burial at a burial site, this being represented in FIG. 1 by the box 108.

Still with reference to FIG. 1, it must be understood that the source of calcium (represented by the box 82) may be other than the limestone slurry already mentioned. This source may be milk of lime or other such compound.

Figure 2:
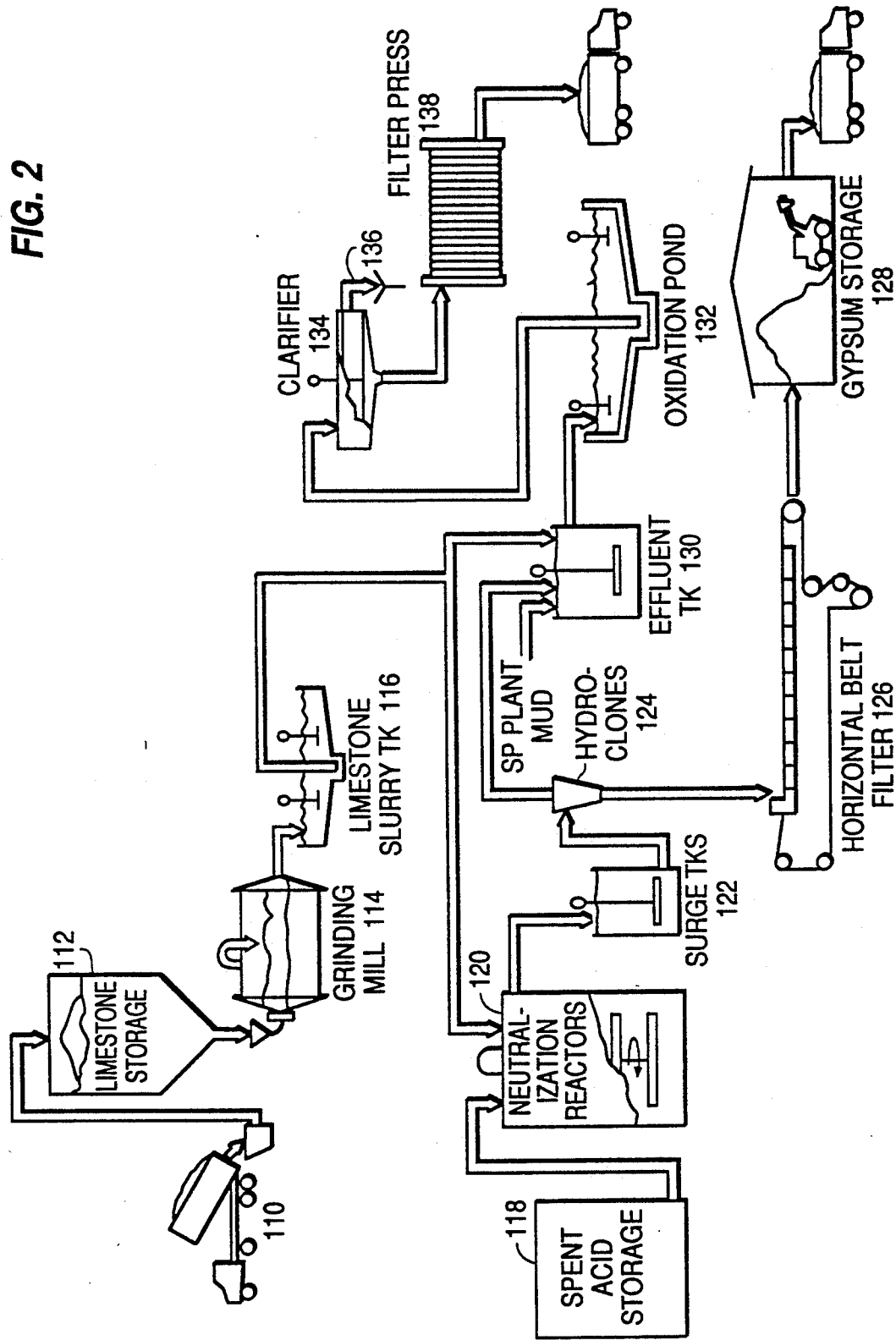
FIG. 2 show the same systems as in FIG. 1, but contain depictions of the apparatus employed in the processes.

Attention is now directed to FIG. 2, which shows in a more detailed manner, the apparatus utilized in the process already explained briefly with regard to FIG. 1.

At the upper left is shown the raw limestone transported by truck 110 and stored in a large silo 112. This limestone is mixed with water as it enters the grinding mill 114. The milled limestone slurry goes to a collecting vessel 116, from where it is transferred to the first and second stages of neutralization.

At the left of FIG. 2, the waste sulfuric acid is collected in container 118, from where it enters a reactor 120 of the first stage of neutralization where live steam is added. At the same time, the limestone slurry in the container 116 is admitted to the reactor 120. The infeeds of acid and of limestone slurry are control led in such a way as to maintain the pH of the contents at a certain level, while the temperature of the contents is maintained at a relatively constant level. The reaction between these two materials produces a gypsum slurry.

Thereafter, the gypsum slurry goes to a second container (not shown) which provides the retention time necessary to ensure adequate crystal growth of the produced-gypsum.

The contents of the latter vessel is then processed over a series of devices 124 which separate the gypsum solids from the crude filtrates. Three series of such liquid/solids separators are used. Surge tanks 122 are located prior to each series of devices. Countercurrent washing coupled with water dilutions do ensure the removal of the impurities.

The gypsum-rich slurry from the third series of devices falls over the feed end of a horizontal vacuum belt filter 126 over which water may be added to provide the final washing of this saleable gypsum product. The latter is stored in a building 128 prior to its shipment to customers.

The filtrate generated by the belt filter and that from the devices are routed to the effluent tank. Limestone slurry from 116 is added to the filtrate. It is important to emphasize that clarification mud from the sulfate process is also admixed with the limestone-filtrate reagents, at this stage of the gypsum process.

If the oxidation step is chosen, the contents of the vessel 130 is directed to an oxidation basin 132, in which air is bubbled up through the mixture (in the preferred form of this invention).

After oxidation, the materials are directed to a clarification step 134 which accomplishes the liquid-solids separation represented in FIG. 1 by the box 102. Here, the supernatant liquid enters a catch basin 136 prior to be discharged to the sewage system; while the sediment is deliquored over a filter press 138 which removes an additional quantity of filtrate before sending the "mud" to a burial step (represented in FIG. 1 by box 108). The filtrate from the filter equipment is returned to the clarifier 134.

DESCRIPTION OF TESTS

We carried out initial neutralization tests, without adding the mud produced by the sulfate process.

In preparation, we generated 125 liters of filtrate coming from the washing of the gypsum suspension produced by the neutralization of the first stage. The 125 liters of filtrate were utilized in a number of tests of the second neutralization stage.

The tests of neutralization were directed to:

a) the use milk of lime (an aqueous suspension of CaO) to a pH of 6.5;

b) milk of lime to a pH of 8.6;

c) an aqueous suspension of limestone (40% by weight $CaCO_3$) to a pH of 6.1;

d) the same process as in c), followed by complete oxidation using air bubbling.

RESULTS a) and b) :The neutralization products obtained were relatively slow to precipitate. The vacuum filter cakes showed a rather low solids content and the texture was very muddy.

c) and d) The suspensions obtained precipitated more rapidly; the vacuum filtration yielded cakes having higher solid percentages. Although an improvement in the cake consistency was noted, the texture nonetheless remained somewhat muddy.

With a view to improving the consistency of the mud while simplifying the control of the muds, we incorporated, into the filtrate from the gypsum washing, some of the clarification solids generated by the sulfate process, prior to proceeding.

Accordingly, we carried out additional tests, still utilizing the same volume of 125 liters of filtrate from the washing of the gypsum suspension:

e) Neutralization to pH of 6.0, utilizing only 50% of the limestone weight that was utilized for tests c) and d). The oxidation of iron was reduced to approximately 50%.

f) This test was the same as the process given under d), but included the addition of a quantity of clarification solids. This solid residue emitted by the sulfate process is normally treated with limestone prior to being transported to a sanitary burial site.

g) Neutralization utilizing 25% of the $CACO_3$ used in test c) and d), with the addition of the clarification solids, but in the absence of oxidation as in c). The proportion of clarification solids was the same as that given under f).

h) The same process as e), but with the addition of clarification solids in accordance with the proportions for f) and g).

RESULTS e) filtration cake rather muddy;

f) the cake had a good consistency, although the solids content was only 60.2%;

g) the cake had an improved texture as compared with that obtained in test c);

h) the filtration cake had a better quality than that yielded by the similar test e);

Finally, we carried out two additional tests, still using the same filtrate from the gypsum washing.

i) the same process as f) but adding only 50% of the quantity of the sulfate mud used in f).

j) the cake was similar to that of test f), i.e. having a reddish color and a rather firm texture;

The test i) confirms that, even if the clarification solids are reduced by half, the cake preserves a good consistency.

In conclusion, the laboratory tests described above have shown that the addition of clarification solids after the neutralization stage has the effect of improving the consistency of the neutralization mud.

Although several specific examples have been given above, it will be evident to those skilled in the art that changes and variations may be made therein, without departing from the invention as set forth in the appended claims.

What is claimed is:

1. For use in conjunction with a process for the production of titanium dioxide pigment and which produces as waste products clarification solids and waste sulfuric acid, a process for treating said waste sulfuric acid comprising:
   a) mixing said waste sulfuric acid with a calcium-containing material to make a first mixture, thus producing a gypsum suspension,
   b) treating the gypsum suspension so as to remove therefrom a liquid portion in the form of a filtrate, and
   c) mixing said filtrate with a calcium-containing substance to make a second mixture, thereby producing a precipitate which is subsequently filtered, wherein step c) further includes mixing a predetermined quantity of said clarification solids with said filtrate and said calcium-containing substance in order thus to improve the consistency of said precipitate and render it suitable for disposal in a landfill.

2. The process claimed in claim 1, in which step c) further includes subjecting the second mixture to oxidation.

3. The process claimed in claim 2, in which the oxidation under step c) includes bubbling air through the second mixture.

4. The process claimed in claim 1, in which both said calcium-containing material and said calcium-containing substance are selected from the group consisting of a) milk of lime and b) limestone.

5. The process claimed in claim 1, in which both said material and said substance are a limestone suspension containing approximately 40% limestone by weight.

6. The process claimed in claim 4, in which step c) further includes subjecting the second mixture to oxidation by bubbling air through the second mixture; and in which both said material and said substance are a limestone suspension containing approximately 40% limestone by weight.

7. The process claimed in claim 1, in which the removal of the said liquid portion in step b) is carried out by supplying the gypsum suspension to three liquid/solid separators operatively arranged in series with one another such that a gypsum-rich slurry emerges from the last of the three liquid/solid separators onto a free end of a horizontal belt filter.

* * * * *